United States Patent
Izumi et al.

(10) Patent No.: US 12,442,943 B2
(45) Date of Patent: Oct. 14, 2025

(54) RADIATION DETECTOR

(71) Applicant: CANON ELECTRON TUBES & DEVICES CO., LTD., Otawara (JP)

(72) Inventors: Takashi Izumi, Nasushiobara (JP); Hiroshi Aida, Meguro (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 293 days.

(21) Appl. No.: 18/346,353

(22) Filed: Jul. 3, 2023

(65) Prior Publication Data

US 2023/0350085 A1 Nov. 2, 2023

Related U.S. Application Data (63) Continuation of application No. PCT/JP2021/017022, filed on Apr. 28, 2021.

(30) Foreign Application Priority Data

Jan. 4, 2021 (JP) .................. 2021-000116

(51) Int. Cl.
G01T 1/20 (2006.01)
(52) U.S. Cl.
CPC ........ G01T 1/20188 (2020.05); G01T 1/2002 (2013.01); G01T 1/2018 (2013.01)
(58) Field of Classification Search
None
See application file for complete search history.

(56) References Cited

U.S. PATENT DOCUMENTS

| | | | |
|---|---|---|---|
| 2009/0022434 A1* | 1/2009 | Chiba | B32B 27/308 383/106 |
| 2010/0276600 A1* | 11/2010 | Ronda | G01T 1/202 250/362 |
| 2012/0001282 A1 | 1/2012 | Goto et al. | |
| 2013/0168555 A1 | 7/2013 | Moon | |
| 2017/0254908 A1 | 9/2017 | Homma et al. | |

FOREIGN PATENT DOCUMENTS

| | | |
|---|---|---|
| EP | 3 244 236 A1 | 11/2017 |
| JP | 61-239200 A | 10/1986 |
| JP | 3-277659 A | 12/1991 |
| JP | 2002-116515 A | 4/2002 |
| JP | 2002-131494 A | 5/2002 |
| JP | 2009-98130 A | 5/2009 |
| JP | 2020-79787 A | 5/2020 |
| JP | 2022-20171 A | 2/2022 |
| WO | WO 2006/082920 A1 | 8/2006 |

OTHER PUBLICATIONS

International Search Report issued Aug. 3, 2021 in PCT/JP2021/017022, filed on Apr. 28, 2023, 3 pages.
Extended European Search Report Issued Oct. 11, 2024 in European Patent Application 21914935.8, 8 pages.

* cited by examiner

*Primary Examiner* — Edwin C Gunberg
(74) *Attorney, Agent, or Firm* — Oblon, McClelland, Maier &Neustadt, L.L.P.

(57) ABSTRACT

According to one embodiment, a radiation detector includes a photoelectric conversion substrate having a detection area and a non-detection area, a scintillator layer, a frame-shaped sealant, a cover, and a moisture absorbing layer. A light transmittance of the moisture absorbing layer is changed by changing an amount of moisture in the moisture absorbing layer. The moisture absorbing layer covers the entire scintillator layer in planar view.

12 Claims, 7 Drawing Sheets

RADIATION DETECTOR

CROSS-REFERENCE TO RELATED APPLICATIONS

This application is a Continuation application of PCT Application No. PCT/JP2021/017022, filed Apr. 28, 2021 and based upon and claiming the benefit of priority from Japanese Patent Application No. 2021-000116, filed Jan. 4, 2021, the entire contents of all of which are incorporated herein by reference.

FIELD

Embodiments described herein relate generally to a radiation detector.

BACKGROUND

As a radiation detector, for example, an X-ray detector (X-ray flat panel detector) is known. The X-ray detector includes a photoelectric conversion substrate on which a plurality of photoelectric conversion elements are provided in a lattice pattern, a scintillator layer provided on the photoelectric conversion substrate and a cover shaped to cover the entire region in which the scintillator layer is formed. The cover is bonded to the photoelectric conversion substrate outside the scintillator layer.

The above cover is moisture-proof cover and is provided with a composite film in which a resin layer and a metal layer are laminated. The metal layer is formed of metal such as aluminum and metal oxide such as aluminum oxide. The cover is bonded to the photoelectric conversion substrate with a thermoplastic resin. A hygroscopic resin is provided on the inside of the cover. This reduces moisture from permeating into the scintillator layer from outside.

The hygroscopic resin provided inside the cover has a saturated amount of moisture absorption. Thus, the hygroscopic resin absorbs a certain amount of moisture and then deactivates its hygroscopic function, making it difficult to retain moisture that has permeated the cover. Then, the moisture reaches the scintillator layer to cause the scintillator layer to deteriorate.

DETAILED DESCRIPTION

In general, according to one embodiment, there is provided a radiation detector comprising: a photoelectric conversion substrate having a detection area and a non-detection area outside the detection area; a scintillator layer provided on the photoelectric conversion substrate and located at least in the detection area; a frame-shaped sealant located in the non-detection area, surrounding the scintillator layer, and bonded to the photoelectric conversion substrate; a cover provided above the scintillator layer, located in the detection area and the non-detection area, and bonded to the sealant to cover the scintillator layer with the photoelectric conversion substrate and the sealant; and a moisture absorbing layer which is provided between the scintillator layer and the cover and located at least in the detection area and whose a light transmittance changes as an amount of moisture inside changes. The moisture absorbing layer covers the entire scintillator layer in planar view.

Embodiments and comparative examples will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

COMPARATIVE EXAMPLE

Figure 1:
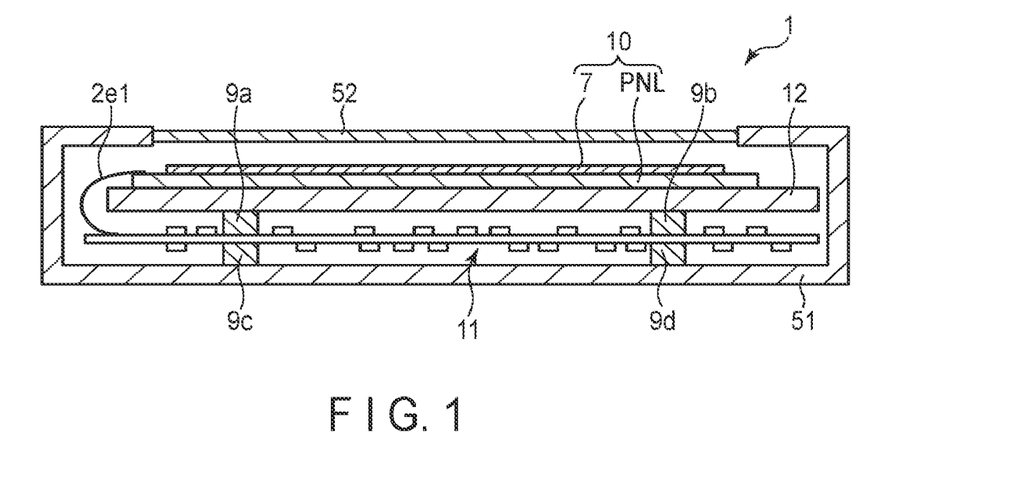
FIG. 1 is a sectional view showing an X-ray detector according to a comparative example.

First, a comparative example will be described. FIG. 1 is a sectional view showing an X-ray detector 1 according to the comparative example. The X-ray detector 1 is an X-ray image detector and an X-ray flat panel detector utilizing an X-ray detection panel.

As shown in FIG. 1, the X-ray detector 1 comprises an X-ray detection module 10, a support substrate 12, a circuit board 11, spacers 9*a*, 9*b*, 9*c* and 9*d*, a housing 51, a flexible printed circuit (FPC) 2*e*1, an incident window 52, and the like. The X-ray detection module 10 includes an X-ray detection panel PNL and a moisture-proof cover 7. The X-ray detection panel PNL is located between the support substrate 12 and the moisture-proof cover 7. The moisture-proof cover 7 is opposed to the incident window 52.

The incident window 52 is attached to the opening of the housing 51. The incident window 52 transmits X-rays. Thus, the X-rays pass through the incident window 52 and enter the X-ray detection module 10. The incident window 52 is formed in a plate shape and has a function of protecting the inside of the housing 51. It is desirable that the incident window 52 is thinned from a material with low X-ray absorption rate. This can reduce X-ray scattering and X-ray dose attenuation, which occur in the incident window 52. The X-ray detector 1 can thus be decreased in thickness and weight.

The X-ray detection module 10, the support substrate 12, the circuit board 11, the FPC 2e1, etc., are accommodated inside the space enclosed by the housing 51 and the incident window 52.

The X-ray detection module 10 is light and low in mechanical strength because it is configured by laminating thin members. Thus, the X-ray detection panel PNL (X-ray detection module 10) is fixed to one flat surface of the support substrate 12 with an adhesive sheet therebetween. The support substrate 12 is shaped like a plate and formed of, for example, aluminum alloy, for example, and its strength is required to stably hold the X-ray detection panel PNL. This reduces the X-ray detection panel PNL from being damaged when external vibration or shock is applied to the X-ray detector 1.

The circuit board 11 is fixed to the other surface of the support substrate 12 with the spacers 9a and 9b therebetween. The use of the spacers 9a and 9b makes it possible to maintain an electrical insulation distance from the support substrate 12, which is mainly formed of metal, to the circuit board 11.

The circuit board 11 is fixed to the inner surface of the housing 51 with the spacers 9c and 9d therebetween. The use of the spacers 9c and 9d makes it possible to maintain an electrical insulation distance from the housing 51, which is mainly formed of metal, to the circuit board 11. The housing 51 supports the support substrate 12 and the like with the circuit board 11 and spacers 9a, 9b, 9c and 9d therebetween.

A connector corresponding to the FPC 2e1 is mounted on the circuit board 11, and the FPC 2e1 is electrically connected to the circuit board 11 via the connector. The FPC 2e1 and the X-ray detection panel PNL are connected together by thermal compression bonding using an anisotropic conductive film (ACF). This method ensures electrical connection between a plurality of fine pads of the X-ray detection panel PNL and those of the FPC 2e1. The pads of the X-ray detection panel PNL will be described later.

As described above, the circuit board 11 is electrically connected to the X-ray detection panel PNL via the connector, the FPC 2e1 and the like. The circuit board 11 electrically drives the X-ray detection panel PNL and electrically processes the signals output from the X-ray detection panel PNL.

Figure 2:
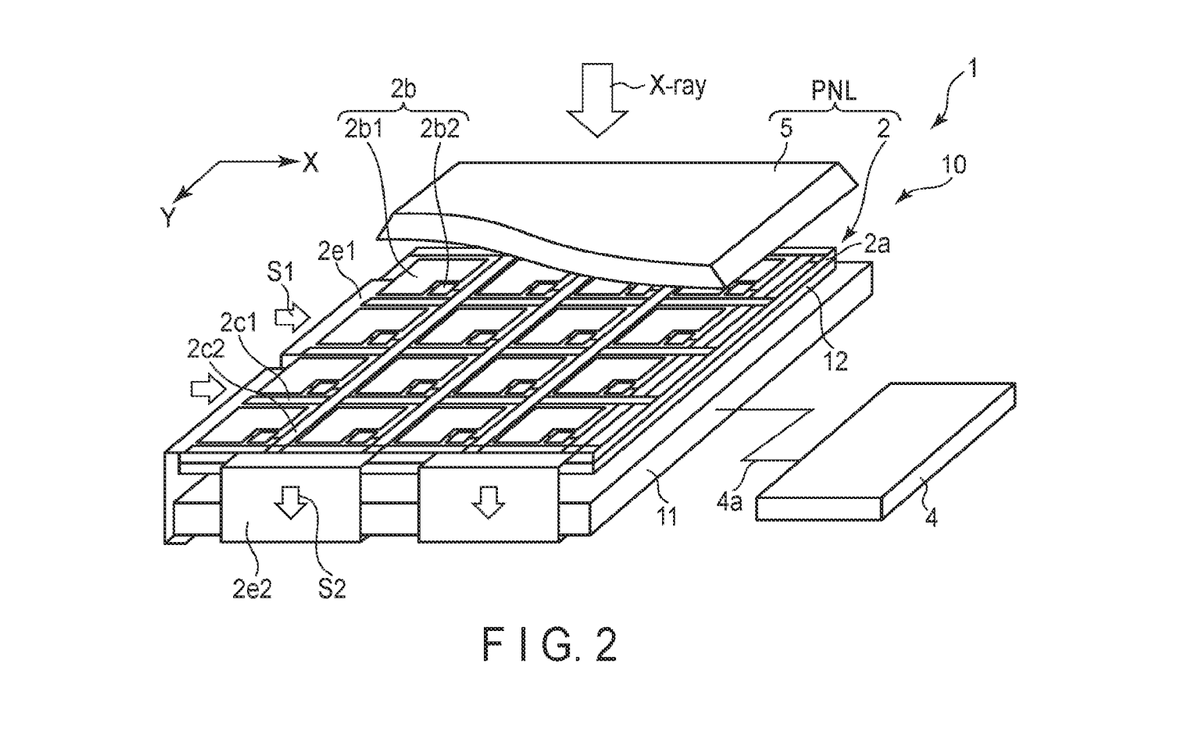
FIG. 2 is a perspective view showing a support substrate, an X-ray detection panel, a circuit board and a plurality of FPCs of the X-ray detector, together with an image transmission unit.

FIG. 2 is a perspective view showing the support substrate 12, the X-ray detection panel PNL, the circuit board 11 and the FPCs 2e1 and 2e2 of the X-ray detector 1 of the comparative example, and also showing an image transmission unit 4. Note that not all members of the X-ray detector 1 are shown in FIG. 2. Some members of the X-ray detector 1, such as a sealant to be described later, are omitted from FIG. 2.

As shown in FIG. 2, the X-ray detection panel PNL includes a photoelectric conversion substrate 2, a scintillator layer 5, and the like. The photoelectric conversion substrate 2 includes a substrate 2a, a photoelectric conversion section 2b, a plurality of control lines (or gate lines) 2c1, a plurality of data lines (or signal lines) 2c2, and the like. Note that the number, arrangement, etc., of the photoelectric conversion section 2b, the control lines 2c1 and the data lines 2c2 are not limited to the example shown in FIG. 2.

The control lines 2c1 extend in a row direction X and are arranged in a column direction Y at predetermined intervals.

The data lines 2c2 extend in the column direction Y, intersect the control lines 2c1, and are arranged in the row direction X at predetermined intervals.

The photoelectric conversion sections 2b are provided on one main surface side of the substrate 2a. The photoelectric conversion sections 2b are provided in quadrangular areas partitioned by the control lines 2c1 and data lines 2c2. One photoelectric conversion section 2b corresponds to one pixel of an X-ray image. The photoelectric conversion sections 2b are arranged in a matrix. It is seen from the above that the photoelectric conversion substrate 2 are array substrates.

Each of the photoelectric conversion sections 2b includes a photoelectric conversion element 2b1 and a thin film transistor (TFT) 2b2 serving as a switching element. The TFT 2b2 is connected to its corresponding one of the control lines 2c1 and its corresponding one of the data lines 2c2. The photoelectric conversion element 2b1 is electrically connected to the TFT 2b2.

The control lines 2c1 are electrically connected to the circuit board 11 via the FPCs 2e1. The circuit board 11 supplies a control signal S1 to the control lines 2c1 via the FPCs 2e1. The data lines 2c2 are electrically connected to the circuit board 11 via the FPCs 2e2. The image data signal S2 converted by the photoelectric conversion element 2b1 (electric charge stored in the photoelectric conversion section 2b) is transmitted to the circuit board 11 via the TFT 2b2, the data line 2c2 and the FPC 2e2.

The X-ray detector 1 further includes an image transmission unit 4. The image transmission unit 4 is connected to the circuit board 11 via a wiring line 4a. Note that the image transmission unit 4 may be incorporated into the circuit board 11.

The image transmission unit 4 generates an X-ray image based on image data signals converted into digital signals by a plurality of analog-to-digital converters, which are not shown. The data of the generated X-ray image is output from the image transmission unit 4 toward an external device.

Figure 3:
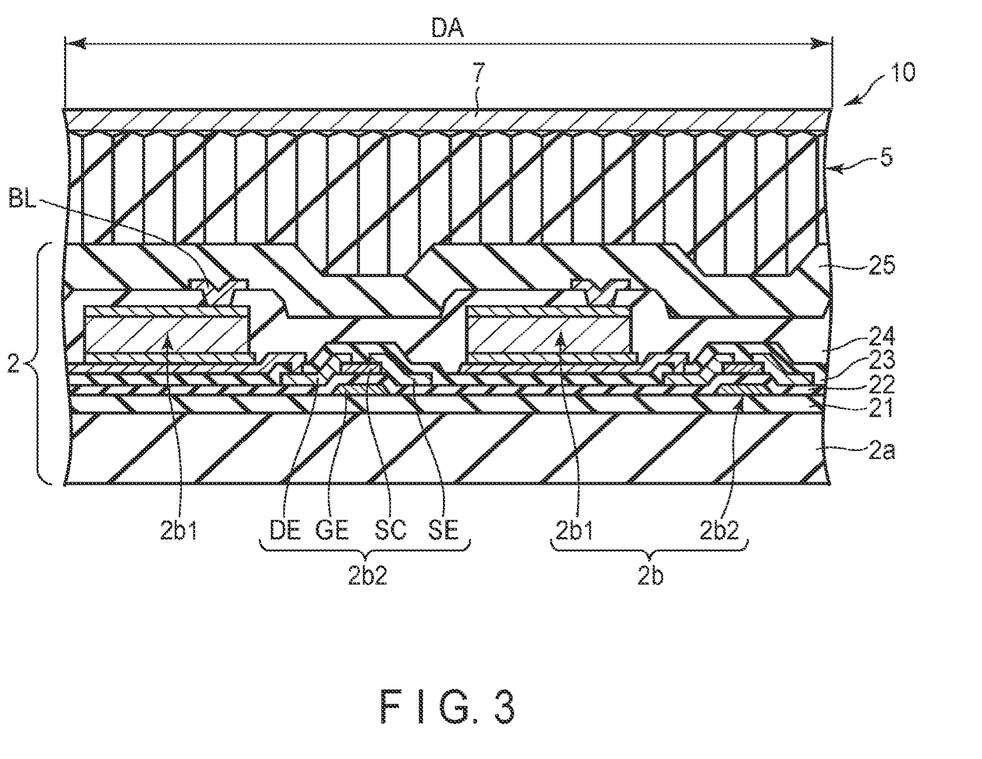
FIG. 3 is an enlarged sectional view showing part of an X-ray detection module of the X-ray detector.

FIG. 3 is an enlarged sectional view showing part of the X-ray detection module 10 of the X-ray detector 1 according to the comparative example.

As shown in FIG. 3, the photoelectric conversion substrate 2 includes a substrate 2a, a plurality of photoelectric conversion sections 2b and a plurality of insulating layers 21, 22, 23, 24 and 25. The photoelectric conversion sections 2b are located in a detection area DA. Each of the photoelectric conversion sections 2b includes a photoelectric conversion element 2b1 and a TFT 2b2.

The TFT 2b2 includes a gate electrode GE, a semiconductor layer SC, a source electrode SE and a drain electrode DE. The photoelectric conversion element 2b1 is configured by a photodiode. Note that the photoelectric conversion element 2b1 may be configured by a charge coupled device (CCD) or the like and has only to be configured to convert light into electric charge.

The substrate 2a is shaped like a plate and is formed of an insulating material. Glass such as alkali-free glass can be taken as an example of the insulating material. The planar shape of the substrate 2a is, for example, a quadrangle. The thickness of the substrate 2a is, for example, 0.7 mm. The insulating layer 21 is provided on the substrate 2a.

The gate electrode GE is formed on the insulating layer 21. The gate electrode GE is electrically connected to the control line 2c1. The insulating layer 22 is provided on the insulating layer 21 and the gate electrode GE. The semiconductor layer SC is provided on the insulating layer 22 and opposed to the gate electrode GE. The semiconductor layer SC is formed of a semiconductor material such as amorphous silicon serving as an amorphous semiconductor and polycrystalline silicon serving as a polycrystalline semiconductor.

The source electrode SE and drain electrode DE are provided on the insulating layer 22 and the semiconductor layer SC. The gate electrode GE, the source electrode SE, the drain electrode DE, the control lines 2c1 and the data lines 2c2 are formed using low-resistance metals such as aluminum and chromium.

The source electrode SE is electrically connected to the source region of the semiconductor layer SC. In addition, the source electrode SE is electrically connected to the data lines 2c2. The drain electrode DE is electrically connected to the drain region of the semiconductor layer SC.

The insulating layer 23 is provided on the insulating layer 22, the semiconductor layer SC, the source electrode SE and the drain electrode DE. The photoelectric conversion element 2b1 is electrically connected to the drain electrode DE. The insulating layer 24 is provided on the insulating layer 23 and the photoelectric conversion element 2b1. A bias line BL is provided on the insulating layer 24 and is connected to the photoelectric conversion element 2b1 through a contact hole formed in the insulating layer 24. The insulating layer 25 is provided on the insulating layer 24 and the bias line BL.

The insulating layers 21, 22, 23, 24 and 25 are formed of an insulating material such as an inorganic insulating material and an organic insulating material. As examples of the inorganic insulating materials, an oxide insulating material, a nitride insulating material and an oxynitride insulating material can be taken. As an example of the organic insulating material, resin can be taken.

The scintillator layer 5 is provided on the photoelectric conversion substrate 2 (photoelectric conversion sections 2b). The scintillator layer 5 is located at least in the detection area DA to cover the photoelectric conversion sections 2b. The scintillator layer 5 is configured to convert incident X-rays into light (visible light, fluorescence).

Note that the photoelectric conversion element 2b1 converts light incident from the scintillator layer 5 into electric charges. The converted electric charge is stored in the photoelectric conversion element 2b1. The TFT 2b2 can switch between storage in the photoelectric conversion element 2b1 and discharge from the photoelectric conversion element 2b1. Note that if the self-capacitance of the photoelectric conversion element 2b1 is insufficient, the photoelectric conversion substrate 2 may further include a capacitor (storage capacitor) to store electric charges converted by the photoelectric conversion element 2b1.

The scintillator layer 5 is formed of thallium-activated cesium iodide (CsI:Tl). If the scintillator layer 5 is formed using the vacuum evaporation method, the scintillator layer 5 composed of an aggregate of a plurality of columnar crystals can be obtained. The thickness of the scintillator layer 5 is, for example, 600 μm. On the outermost surface of the scintillator layer 5, the thickness of the columnar crystals of the scintillator layer 5 is 8 μm to 12 μm.

The material for forming the scintillator layer 5 is not limited to CsI:Tl. The scintillator layer 5 may be formed of thallium-activated sodium iodide (NaI:Tl), sodium-activated cesium iodide (CsI:Na), europium-activated cesium bromide (CsBr:Eu), sodium iodide (NaI), gadolinium oxysulfide ($Gd_2O_2S$), and the like.

Note that a mask with an opening is used when the scintillator layer 5 is formed by vacuum deposition. In this case, the scintillator layer 5 is formed in a region of the photoelectric conversion substrate 2 which faces the opening. With the deposition, scintillator materials are also deposited on the surface of the mask. Then, the scintillator materials are also deposited in the vicinity of the opening of the mask, and crystals grow to gradually protrude into the opening. If the crystals protrude from the mask into the opening, the scintillator materials are reduced from being evaporated on the photoelectric conversion substrate 2 in the vicinity of the opening. Therefore, as shown in FIG. 2, the thickness of the vicinity of the periphery of the scintillator layer 5 gradually decreases toward the outside.

Alternatively, the scintillator layer 5 may include a plurality of scintillator units which are arranged in a matrix and provided in the photoelectric conversion sections 2b in a one-to-one relationship, and each of which is shaped like a quadrilateral prism. To form such a scintillator layer 5, a scintillator material in which gadolinium oxysulfide phosphor particles are mixed with a binder material is applied onto the photoelectric conversion substrate 2, and the scintillator material is fired and hardened. Then, a grid-like groove is formed in the scintillator material by, for example, dicing with a dicer. In the above case, an inert gas such as air or nitrogen ($N_2$) for antioxidation is sealed between the scintillator units. Alternatively, space between the scintillator units may be depressurized from atmospheric pressure.

The moisture-proof cover (moisture-proof film) 7 as a film-like cover is provided above the scintillator layer 5 to cover the scintillator layer 5. The moisture-proof cover 7 is provided to reduce the properties of the scintillator layer 5 from being degraded by moisture contained in the atmosphere. The moisture-proof cover 7 completely covers the exposed portion of the scintillator layer 5. The moisture-proof cover 7 is in contact with the scintillator layer 5.

The moisture-proof cover 7 is formed of a sheet containing metal. As examples of the metal, metal including aluminum, metal including copper, metal including magnesium, metal including tungsten, stainless steel, kovar, etc., can be taken. If the moisture-proof cover 7 contains metal, it can prevent or significantly suppress moisture penetration.

The moisture-proof cover 7 may also be formed of a laminated sheet in which a resin layer and a metal layer are laminated. In this case, the resin layer can be formed of materials such as polyimide resin, epoxy resin, polyethylene terephthalate resin, Teflon (registered trademark), low density polyethylene, high density polyethylene, and elastic rubber. The metal layer may, for example, contain the metal described above. The metal layer can be formed using sputtering, lamination, and the like.

In this case, it is preferable to provide the metal layer closer to the scintillator layer 5 rather than the resin layer. Since the metal layer can be covered by the resin layer, the metal layer can be prevented from being damaged by external force. If the metal layer is provided closer to the scintillator layer 5 rather than the resin layer, the properties of the scintillator layer 5 can be prevented from being damaged by moisture permeation through the resin layer.

As examples of the moisture-proof cover 7, a sheet containing a metal layer, a sheet containing an inorganic insulating layer, a laminated sheet in which a resin layer and a metal layer are laminated, and a laminated sheet in which a resin layer and an inorganic insulating layer are laminated, can be taken. It is seen from the above that the inorganic layer of the moisture-proof cover 7 is not limited to a metal layer but may be an inorganic insulating layer. Alternatively, the moisture-proof cover 7 may have both a metal layer and an inorganic insulating layer. The inorganic insulating layer can be formed by a layer containing silicon oxide, aluminum oxide, and the like. The inorganic insulating layer can be formed by sputtering or the like. In this comparative example, the moisture-proof cover 7 is formed of a thin aluminum foil.

Figure 4:
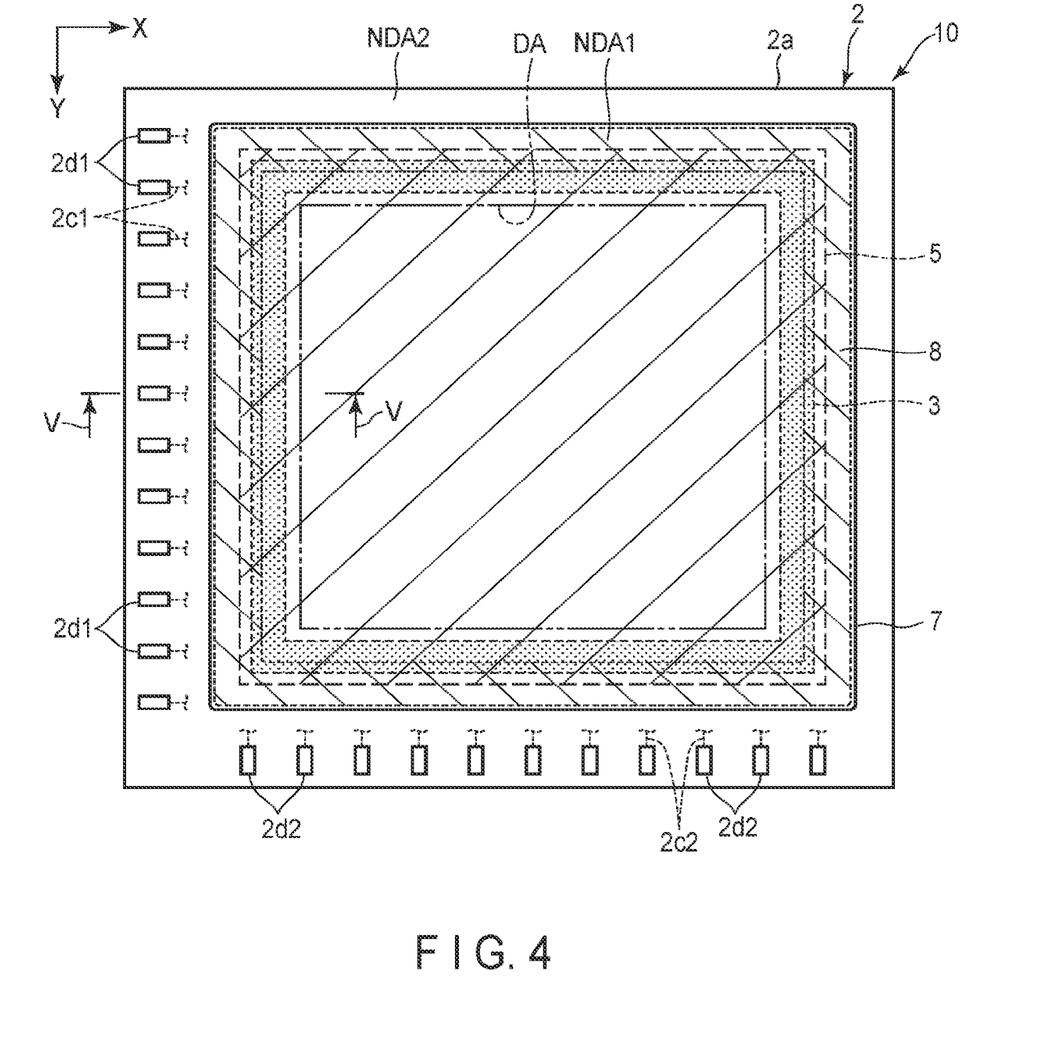
FIG. 4 is a plan view showing the X-ray detection module.
Figure 5:
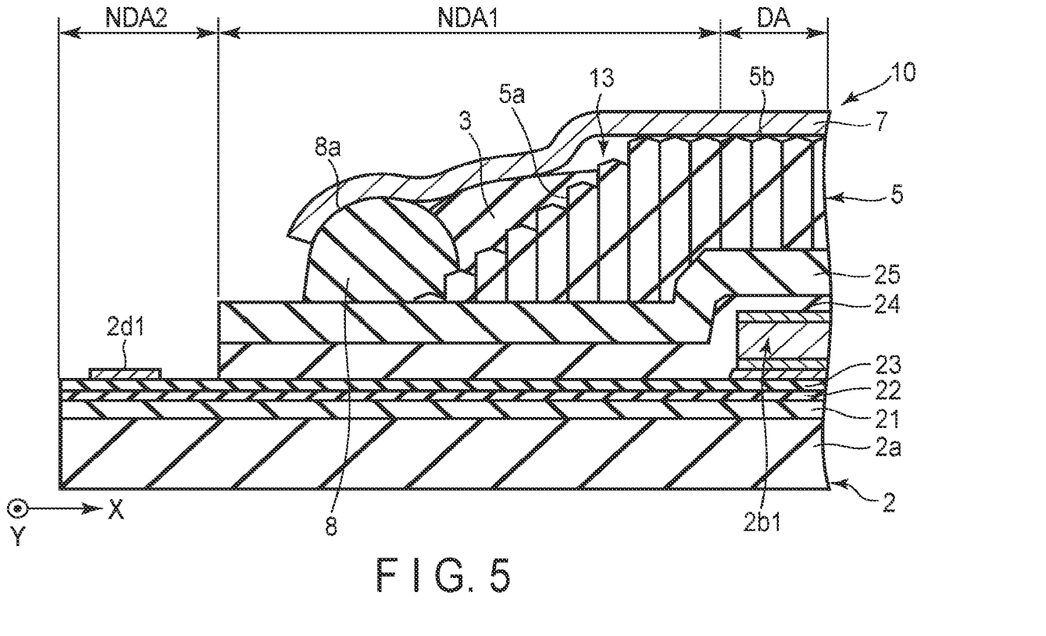
FIG. 5 is a sectional view of part of the X-ray detection module taken along line V-V.

FIG. 4 is a plan view showing the X-ray detection module 10. In FIG. 4, the scintillator layer 5 is shaded upward to the right, a sealant 8 is shaded downward to the right, and a moisture absorbing member 3 is shown with a dot pattern. FIG. 5 is a sectional view showing part of the X-ray detection module 10, taken along line V-V.

As shown in FIGS. 4 and 5, the photoelectric conversion substrate 2 includes a detection area DA and a non-detection area outside the detection area DA. The detection area DA is a quadrangular area. The non-detection area of the photoelectric conversion substrate 2 includes a frame-shaped first non-detection area NDA1 located around the detection area DA and a second non-detection area NDA2 outside the first non-detection area NDA1. In this comparative example, the second non-detection area NDA2 is shaped like a frame.

The scintillator layer 5 is located at least in the detection area DA. The scintillator layer 5 has a side surface 5a and a top surface 5b. The side surface 5a is located in the first non-detection area NDA1. The side surface 5a is a forward tapered surface. The top surface 5b of the scintillator layer 5 is opposed to the moisture-proof cover 7.

The photoelectric conversion substrate 2 further includes a plurality of pads 2d1 and a plurality of pads 2d2. The pads 2d1 and 2d2 are located in the second non-detection area NDA2. In this comparative example, the pads 2d1 are arranged along the left side of the substrate 2a, and the pads 2d2 are arranged along the lower side of the substrate 2a. For example, the pads 2d1 and 2d2 are provided on the insulating layer 23 and are not covered with the insulating layer 24 or the insulating layer 25.

The pads are schematically shown in FIG. 4. The number, shape, size, location or pitch of the pads is not limited to the example shown in FIG. 4.

One control line 2c1 extends on the detection area DA, the first non-detection area NDA1 and the second non-detection area NDA2, and is electrically connected to one of the pads 2d1. One data line 2c2 extends on the detection area DA, the first non-detection area NDA1 and the second non-detection area NDA2, and is electrically connected to one of the pads 2d2.

One of the lines provided in the FPC 2e1 is electrically connected to one pad 2d1, and one of the lines provided in the FPC 2e2 is electrically connected to one pad 2d2 (FIG. 2).

The X-ray detection module 10 further includes the sealant 8. The sealant 8 is located in the first non-detection area NDA1 to surround the scintillator layer 5. The sealant 8 is shaped like a frame and continuously extends around the scintillator layer 5. The sealant 8 is bonded to the photoelectric conversion substrate 2 (for example, the above insulating layer 25). In this comparative example, the sealant 8 is in contact with the side surface 5a of the scintillator layer 5.

If the shape of the outer surface 8a of the sealant 8 is a curved surface projecting outward, the vicinity of the periphery of the moisture-proof cover 7 can easily be modeled after the outer surface 8a of the sealant 8. It is thus easy to bring the moisture-proof cover 7 into contact with the sealant 8. Since, furthermore, the moisture-proof cover 7 can be gently deformed, defects such as cracks can be reduced from occurring in the moisture-proof cover 7 even though the moisture-proof cover 7 is thinned.

The moisture-proof cover 7 is located in the detection area DA and the first non-detection area NDA1. The moisture-proof cover 7 completely covers the scintillator layer 5 in the plan view of FIG. 4. As shown in FIG. 5, the moisture-proof cover 7 completely covers the part of the scintillator layer 5 that is not covered with the photoelectric conversion substrate 2 or the sealant 8. In other words, the moisture-proof cover 7 covers the scintillator layer 5, together with the photoelectric conversion substrate 2 and the sealant 8.

The moisture-proof cover 7 is bonded directly to the outer surface 8a of the sealant 8. The moisture-proof cover 7 covers at least part of the sealant 8. If the moisture-proof cover 7 and the sealant 8 are bonded together, for example, in an environment whose pressure is lower than atmospheric pressure, the moisture-proof cover 7 can be brought into contact with the top surface 5b of the scintillator layer 5.

In general, the scintillator layer 5 has a void of approximately 10% to 40% of its volume. If, therefore, gas is contained in the air gap, it may expand to break the moisture-proof cover 7 when the X-ray detector 1 is transported by an aircraft or when it is used at high altitude. If the moisture-proof cover 7 and the sealant 8 are bonded together in an environment where the pressure is lower than atmospheric pressure, the moisture-proof cover 7 can be prevented from being broken even though the X-ray detector 1 is transported by an aircraft. From the above, it is preferable that the pressure in the space defined by the photoelectric conversion substrate 2, sealant 8 and moisture-proof cover 7 be lower than the atmospheric pressure.

In addition, as will be described later, the vicinity of the periphery of the moisture-proof cover 7 and the sealant 8 are bonded together by heating the vicinity of the periphery of the moisture-proof cover 7. If, in this case, the temperature of the vicinity of the periphery of the moisture-proof cover 7 and that of the sealant 8 decrease, thermal stress is generated between the vicinity of the periphery of the moisture-proof cover 7 and the sealant 8. If thermal stress is generated between the vicinity of the periphery of the moisture-proof cover 7 and the sealant 8, peeling may be caused between the vicinity of the periphery of the moisture-proof cover 7 and the sealant 8. If peeling is caused, moisture-proof performance may deteriorate significantly.

Since the moisture-proof cover 7 of this embodiment is formed of a thin aluminum foil, it can easily extend when thermal stress is generated. Thus, the thermal stress can be relaxed, and the vicinity of the periphery of the moisture-proof cover 7 can be prevented from peeling from the sealant 8.

The sealant 8 is formed of a material containing a thermoplastic resin. The sealant 8 is formed of a material containing thermoplastic resin as a main component. The sealant 8 may be formed of 100% thermoplastic resin. Alternatively, the sealant 8 may be formed of a material in which additives are mixed with the thermoplastic resin. If the sealant 8 contains thermoplastic resin as a main component, it can cause the photoelectric conversion substrate 2 and the moisture-proof cover 7 to be bonded together by heating.

The thermoplastic resin can be made using nylon, polyethyleneterephthalate (PET), polyurethane, polyester, polyvinyl chloride, acrylonitrile butadiene styrene (ABS), acrylic, polystyrene, polyethylene, polypropylene, etc. In this case, the moisture vapor transmission rate of polyethylene is 0.068 g·mm/day·m$^2$ and that of polypropylene is 0.04 g·mm/day·m$^2$. These moisture vapor transmission rates are low. If, therefore, the sealant 8 contains at least one of polyethylene and polypropylene as a main component, moisture that penetrates the sealant 8 and reaches the scintillator layer 5 can greatly be reduced.

The stiffness of the thermoplastic resin can be made lower than that of the moisture-proof cover 7.

The X-ray detection module 10 further includes a moisture absorbing member 3. The moisture absorbing member 3 is provided in a space enclosed by the photoelectric conversion substrate 2, the scintillator layer 5, the sealant 8 and the moisture-proof cover 7. In the present embodiment, the moisture absorbing member 3 is in contact with the side surface 5a of the scintillator layer 5 and the outer surface 8a of the sealant 8, and is not in contact with the photoelectric conversion substrate 2. The moisture absorbing member 3 is provided to fill a void 13 formed by the scintillator layer 5, the sealant 8 and the moisture-proof cover 7. The moisture absorbing member 3 is formed by forming the scintillator layer 5, the sealant 8, etc., and then applying a moisture absorbing material along a groove between the scintillator layer 5 and the sealant 8.

The moisture absorbing member 3 is formed of resin containing sodium polyacrylate. The moisture absorbing member 3 is formed of a material containing sodium polyacrylate as a main component. The moisture absorbing member 3 may be formed of 100% sodium polyacrylate. Alternatively, the moisture absorbing member 3 may be formed of a material in which additives are mixed with sodium polyacrylate.

The sodium polyacrylate is a type of highly hygroscopic polymer used in disposable diapers and sanitary products. In addition, the sodium polyacrylate has a hydrophilic carboxyl group and incorporates a large number of water molecules into a network to form a gel structure. Thus, it can absorb and retain water hundreds to thousands of times its own weight without dissolving in water.

With respect to moisture, the moisture absorbing member 3 has a higher absorption rate than that of the sealant 8. In the comparative example, the moisture absorbing member 3 has a larger moisture absorbing amount than that of the sealant 8. If moisture permeates the sealant 8 due to long-term use, the void 13 serving as a moisture permeation path is filled with the moisture absorbing member 3 to cause the moisture absorbing member 3 to absorb moisture before the moisture reaches the scintillator layer 5. Therefore, even if moisture permeates the sealant 8, the moisture absorbing member 3 can absorb and retain the moisture to reduce the scintillator layer 5 from deteriorating.

In the comparative example, the space (void 13) which is enclosed by the photoelectric conversion substrate 2, the sealant 8 and the moisture-proof cover 7 and in which the moisture absorbing member 3 is located is depressurized from atmospheric pressure. The sealant 8 is melted by heating from outside the moisture-proof cover 7 to bring the resin of the melted sealant 8 into intimate contact with the surface of the moisture-proof cover 7, and then the sealant 8 is cooled to bond the sealant 8 and the moisture-proof cover 7 together.

The X-ray detector 1 is configured as described above.

According to the X-ray detector 1 according to the comparative example configured as described above, the moisture-proof cover 7 can be attached to the photoelectric conversion substrate 2 by the sealant 8 to reduce moisture from reaching the scintillator layer 5. However, even if the scintillator layer 5 is covered with the moisture-proof cover 7, not a little moisture permeates the sealant 8, which serves an adhesive, and the scintillator layer 5 is likely to deteriorate.

To reduce the above deterioration, the X-ray detector 1 includes the moisture absorbing member 3. Even if moisture permeates the sealant 8, the moisture absorbing member 3 can reduce moisture from reaching the scintillator layer 5. However, the moisture absorbing member 3 has a saturated moisture absorption amount. Thus, the moisture absorbing member 3 deactivates its moisture absorbing function after absorbing a certain amount of moisture, making it difficult to trap moisture that has entered the space enclosed by the photoelectric conversion substrate 2, the sealant 8 and the moisture-proof cover 7. Then, the moisture reaches the scintillator layer 5, which leads to deterioration of the scintillator layer 5.

ONE EMBODIMENT

Figure 6:
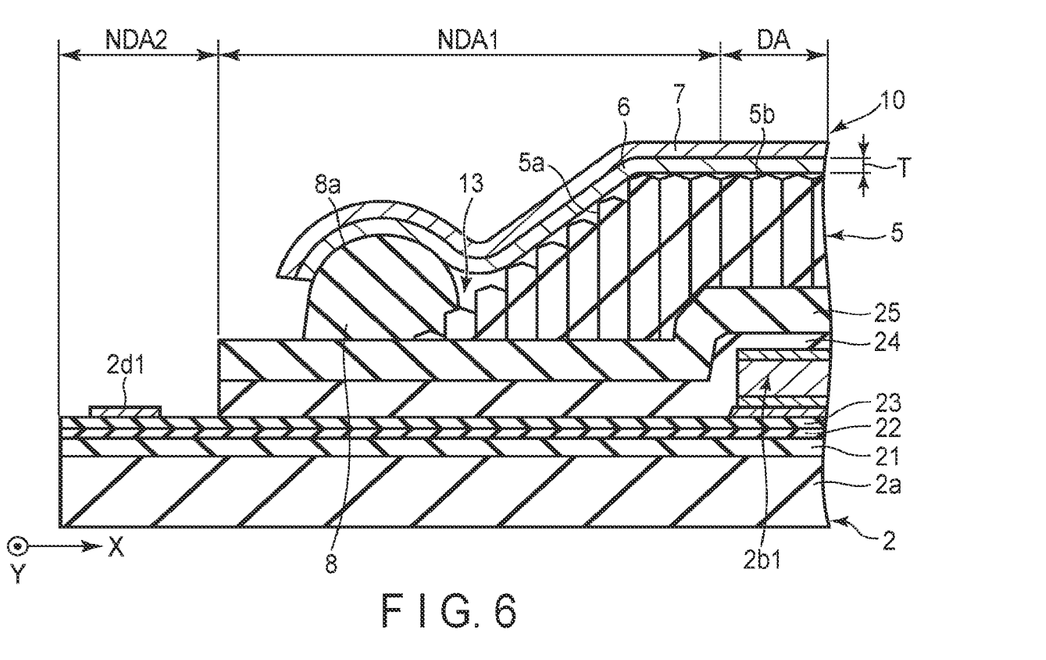
FIG. 6 is a sectional view showing part of the X-ray detection module of the X-ray detector according to an embodiment.
Figure 7:
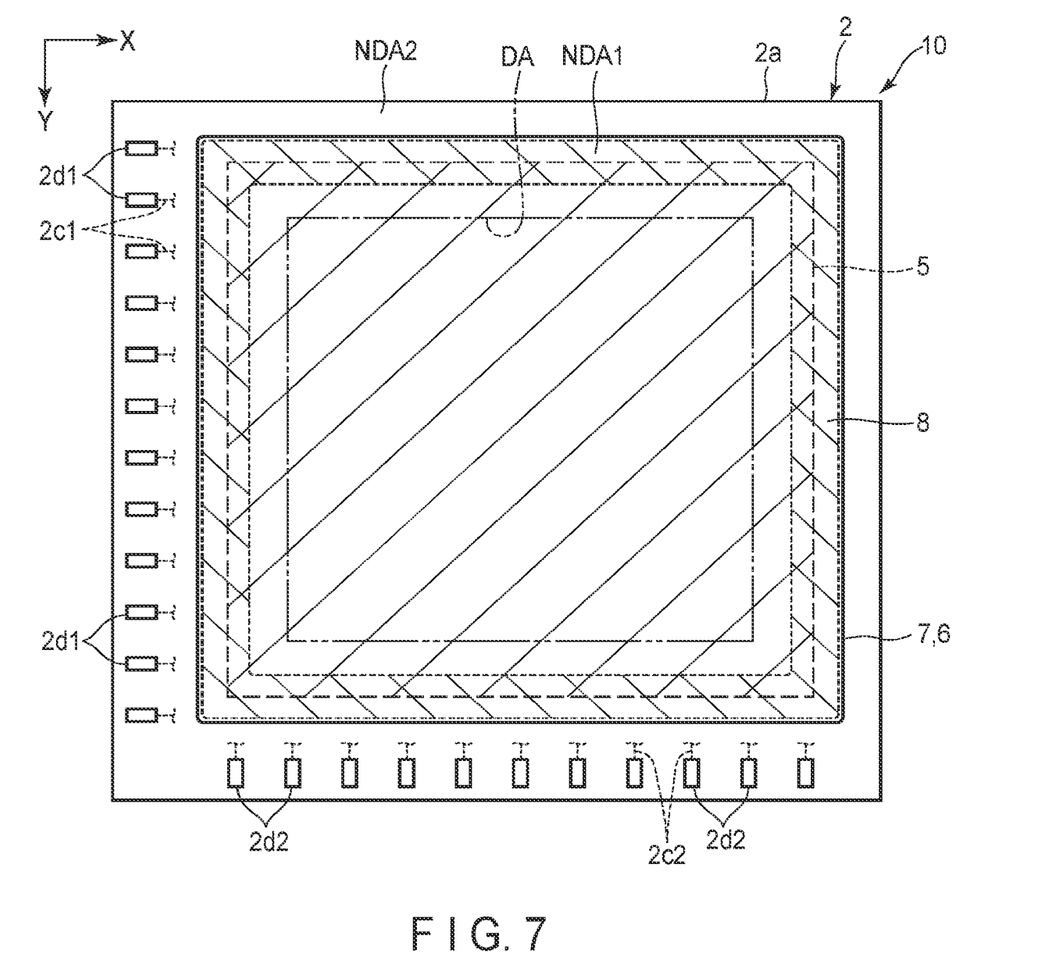
FIG. 7 is a plan view showing the X-ray detection module shown in FIG. 6.

Next is a description of one embodiment. The X-ray detector 1 is configured in the same manner as that of the above comparative example, except for the configuration described in the present embodiment. FIG. 6 is a sectional view showing part of an X-ray detection module 10 of the X-ray detector 1 according to the present embodiment. FIG. 7 is a plan view showing the X-ray detection module 10 shown in FIG. 6. In FIG. 7, a scintillator layer 5 is shaded upward to the right and a sealant 8 is shaded downward to the right.

As shown in FIGS. 6 and 7, a moisture-proof cover 7, which is a cover, is provided above the scintillator layer 5, located in a detection area DA and a first non-detection area NDA1, and is bonded to the sealant 8. The moisture-proof cover 7 covers the scintillator layer 5 with a photoelectric conversion substrate 2 and the sealant 8. The scintillator layer 5 is sealed with the photoelectric conversion substrate 2, the sealant 8 and the moisture-proof cover 7.

The X-ray detector 1 further includes a moisture absorbing layer 6. The moisture absorbing layer 6 is provided between the scintillator layer 5 and the moisture-proof cover 7. The moisture absorbing 6 is in contact with the scintillator layer 5. The moisture absorbing layer 6 is laminated on that side of the moisture-proof cover 7 which is opposed to the scintillator layer 5 and bonded to the moisture-proof cover 7. The moisture absorbing layer 6 is located at least in the detection area DA. The moisture absorbing layer 6 has a characteristic that the light transmittance changes as the amount of moisture in the moisture absorbing layer 6 changes.

The moisture absorbing layer 6 contains aluminosilicates, aluminum oxide or silica gel. As the aluminosilicates, for example, zeolite can be taken. More specifically, the moisture absorbing layer 6 contains 50 wt % or more of aluminosilicates (zeolites), aluminum oxide or silica gel. The moisture absorbing layer 6 may be formed only of aluminosilicates (zeolites), aluminum oxide or silica gel. Alternatively, the moisture absorbing layer 6 may be a mixture of resin and one of aluminosilicate (zeolite), aluminum oxide and silica gel.

The aluminosilicate (zeolite), which is a physical desiccant, is a desiccant having a porous structure on its surface and using the properties of adsorbing moisture in voids of the porous structure. For example, the moisture absorbing layer 6 has a saturated amount of moisture absorption of approximately 5.1 $g/m^2$ in an environment where the temperature is 25 degrees Celsius and the humidity is 50%. In addition, as the components and their contents, the moisture absorbing layer 6 contains 30 wt % to 95 wt % polyethylene and 5 wt % to 70 wt % synthetic zeolite. The moisture absorbing layer 6 can absorb and retain moisture in the space enclosed by the photoelectric conversion substrate 2, the sealant 8 and the moisture-proof cover 7, even if moisture permeates the sealant 8. The scintillator layer 5 can thus be reduced from deteriorating.

The moisture absorbing layer 6 is, for example, white in its initial state in which it absorbs no moisture. In a state where the amount of moisture absorption is saturated, the moisture absorbing layer 6 is, for example, transparent. From the above, the moisture absorbing layer 6 changes from white to transparency with an increase in the amount of moisture inside.

The white moisture absorbing layer 6 functions as a light-reflecting layer. The moisture absorbing layer 6 can increase the utilization efficiency of light (fluorescence) to contribute to improving the resolution and sensitivity. The moisture absorbing layer 6 can reflect light generated in the scintillator layer 5 and directed to the side opposite to the side where the photoelectric conversion section 2b is provided, to direct the reflected light toward the photoelectric conversion section 2b.

On the other hand, the color of the moisture-proof cover 7, which is aluminum foil, is exposed from the transparent moisture absorbing layer 6 when viewed from the scintillator layer 5. The reflection efficiency of the moisture-proof cover 7 is lower than that of the white moisture absorbing layer 6. When the amount of moisture absorption in the moisture absorbing layer 6 is saturated, both the resolution and sensitivity of X-ray images decrease by about 10%.

If, therefore, the resolution and sensitivity are monitored, the amount of moisture that has entered the space enclosed by the photoelectric conversion substrate 2, the sealant 8 and the moisture-proof cover 7 can be detected. The monitoring can be used as a guide for deactivation of the moisture absorption function of the moisture absorbing layer 6 and can also be used as a guide for the time of repair of the X-ray detector 1, such as replacement of the moisture absorbing layer 6 (a laminate of the moisture absorbing layer 6 and the moisture-proof cover 7). Moreover, the X-ray detector 1 can be repaired before the scintillator layer 5 deteriorates.

Incidentally, if the moisture absorbing layer 6 is replaced and repaired, the moisture absorbing layer 6 and the moisture-proof cover 7 need to be removed by the unit of laminate. However, the laminate is only bonded to the thermoplastic sealant 8 and is easily removed.

The moisture absorbing layer 6 covers the entire scintillator layer 5 in planar view. The moisture absorbing layer 6 extends above the sealant 8 with the moisture-proof cover 7. In the present embodiment, the moisture absorbing layer 6 has the same size as that of the moisture-proof cover 7 in planar view, and completely lies on the moisture-proof cover 7. The moisture absorbing layer 6 is bonded directly to the sealant 8. Therefore, the moisture-proof cover 7 is indirectly bonded to the sealant 8.

As described above, the amount of moisture absorption of the moisture absorbing layer 6 can be increased by increasing the size of the moisture absorbing layer 6 in planar view as much as possible. For example, in an environment where the temperature is 25 degrees Celsius and the humidity is 50%, if the thickness T of the moisture absorbing layer 6 is 80 μm, the amount of moisture absorption of the moisture absorbing layer 6 is 5.1 g/m$^2$. As the area of the moisture absorbing layer 6 increases, the amount of moisture absorption of the moisture absorbing layer 6 increases. Note that the thickness T is not limited to 80 μm.

Since the elastic modulus of the moisture absorbing layer 6 is lower than that of the moisture-proof cover 7, the stiffness of the moisture absorbing layer 6 is lower than that of the moisture-proof cover 7. This is because the thermoplastic sealant 8 is melted by heating from outside the moisture-proof cover 7, the melted sealant 8 is bonded to the surface of the moisture-proof cover 7, and then the resultant structure is cooled, thereby to bond the moisture-proof cover 7 to the sealant 8.

During the heating and cooling for bonding, contraction of the moisture absorbing layer 6 is inevitable, and an interface between the moisture-proof cover 7 and the moisture absorbing layer 6 is stressed against the contraction. It is thus desirable that the stiffness (elastic modulus) of the moisture absorbing layer 6 is not high. This is because the stress may cause delamination of the interface between the moisture absorbing layer 6 and the moisture-proof cover 7.

To avoid the above problem, the elastic modulus of the moisture absorbing layer 6 is decreased such that it is made lower than that of the moisture-proof cover 7 in the present embodiment. This makes it difficult to cause "wrinkling" or "bending" on the surface of the moisture-proof cover 7 by decreasing the stress at the interface and makes it possible to reduce the moisture-proof performance from being degraded due to the "wrinkling" or "bending".

To avoid the above problem, the stress at the interface between the moisture absorbing layer 6 and the moisture-proof cover 7 can be reduced by lowering the stiffness (elastic modulus) of the moisture-proof cover 7. If, however, the stiffness of the moisture-proof cover 7 is reduced, the surface of the moisture-proof cover 7 is likely to be "wrinkled" or "bent" by the stress at the above interface. Accordingly, delamination and air bubbles occur at the interface between the sealant 8 and the moisture-proof cover 7 at the "wrinkled" or "bent" portions. In turn, water vapor easily enters the scintillator layer 5 to degrade the scintillator layer 5. It is therefore undesirable to reduce the stiffness of the moisture-proof cover 7.

According to the X-ray detector 1 of the embodiment configured as described above, the X-ray detector 1 comprises the photoelectric conversion substrate 2, the scintillator layer 5, the sealant 8 and the moisture-proof cover 7. The moisture-proof cover 7 seals the scintillator layer 5 airtightly together with the photoelectric conversion substrate 2 and the sealant 8. Even if the scintillator layer 5 is sealed with the photoelectric conversion substrate 2, the sealant 8 and the moisture-proof cover 7, the long-term use may generate not a small amount of moisture permeating through the sealant 8 to cause the scintillator layer 5 to deteriorate. For example, the scintillator layer 5 needs to avoid a situation in which it absorbs moisture to be fluidified because of its deliquescence. As the scintillator layer 5 deteriorates, conversion from X-ray (radiation) to light (fluorescence) becomes difficult.

Thus, the X-ray detector 1 further includes the moisture absorbing layer 6. With respect to moisture, the moisture absorbing layer 6 has a higher absorption rate than that of the sealant 8. With the moisture absorbing layer 6 in the X-ray detector 1, moisture can be prevented from permeating through the scintillator layer 5. In other words, the X-ray detector 1 may have high moisture-proof performance. Accordingly, the X-ray detector 1 can extend its product life.

The moisture absorbing layer 6 has the characteristics that the light transmittance changes as the amount of moisture in the layer 6 changes. The X-ray detector 1 can thus be repaired before the scintillator layer 5 deteriorates.

From the above, the X-ray detector 1 capable of detecting the amount of moisture permeating into the X-ray detector can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 8:
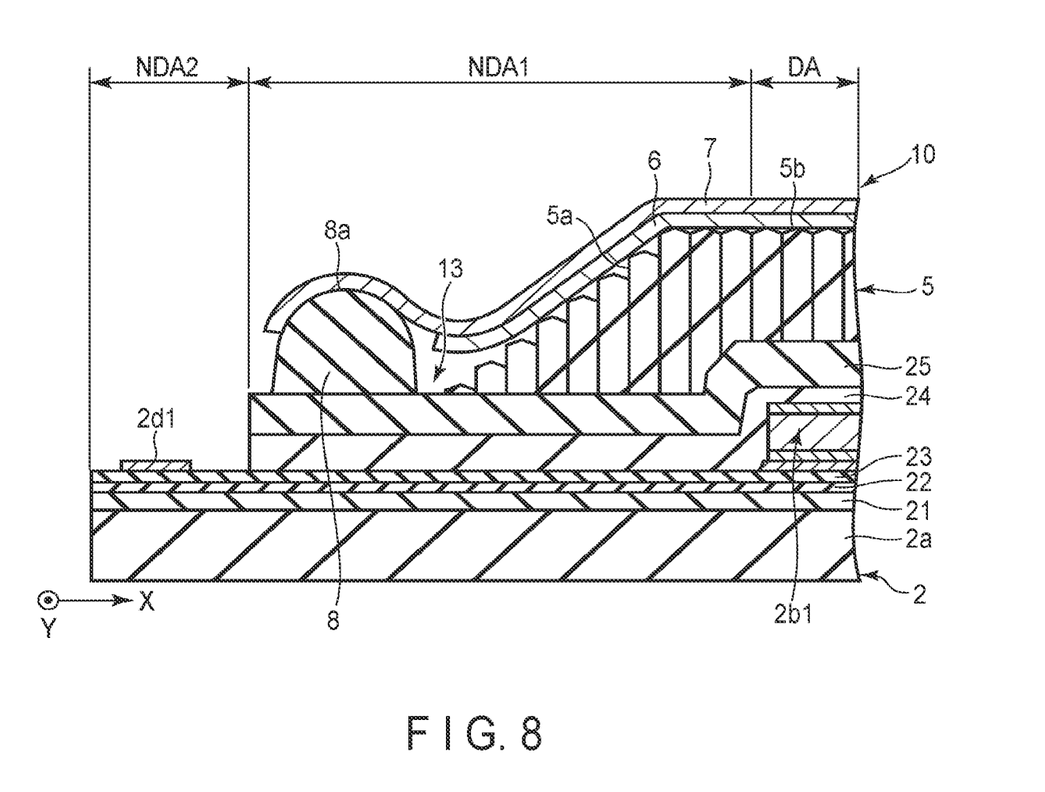
FIG. 8 is a sectional view showing part of an X-ray detection module of an X-ray detector according to modification 1 of the embodiment.
Figure 9:
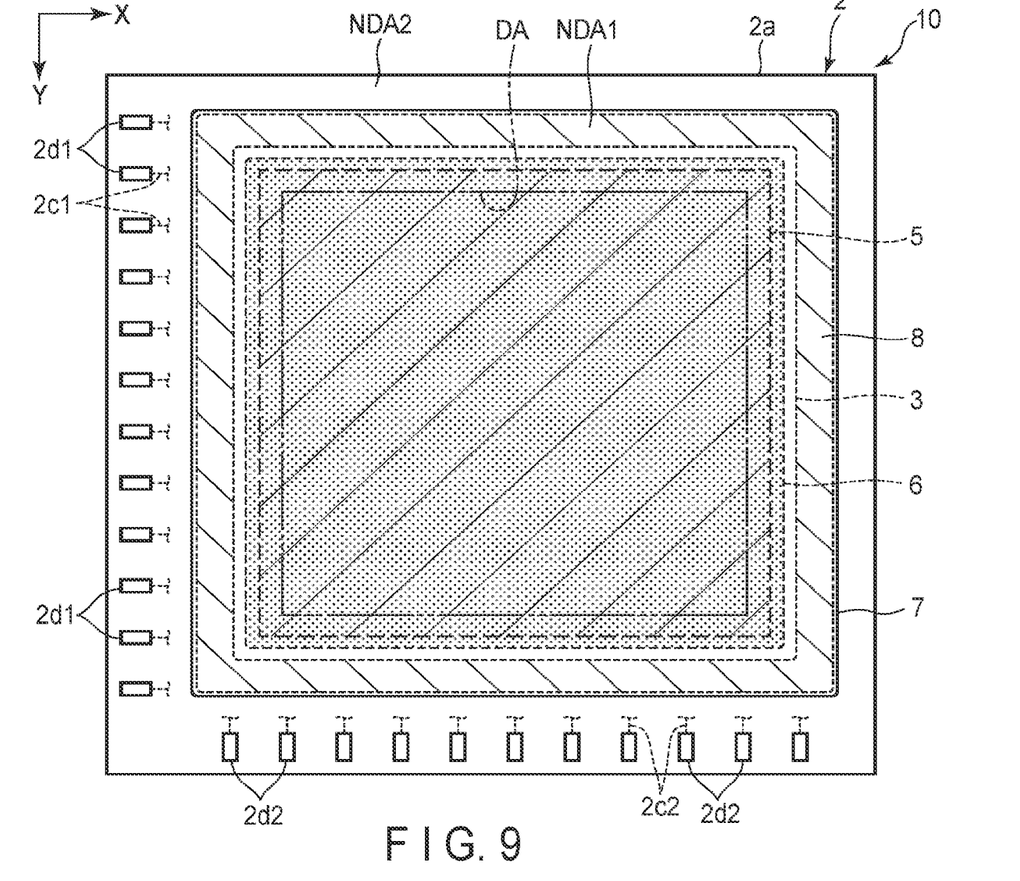
FIG. 9 is a plan view showing the X-ray detection module shown in FIG. 8.

For example, as shown in FIGS. 8 and 9, in planar view, the size of the moisture absorbing layer 6 may be smaller than that of the moisture-proof cover 7. Even in modification 1 shown in FIGS. 8 and 9, the moisture absorbing layer 6 covers the entire scintillator layer 5 in planar view. The moisture absorbing layer 6 does not extend above the sealant 8. The moisture-proof cover 7 is bonded directly to the sealant 8. The entire moisture absorbing layer 6 is located inside the space enclosed by the photoelectric conversion substrate 2, the sealant 8 and the moisture-proof cover 7. Since the moisture absorbing layer 6 is not exposed to the outside of the above space, unwanted moisture can be prevented from entering the moisture absorbing layer 6. Even in modification 1, the X-ray detector 1 capable of detecting the amount of moisture permeating into the X-ray detector can be obtained. In FIG. 9, the scintillator layer 5 is shaded upward to the right, the sealant 8 is shaded downward to the right, and the moisture absorbing layer 6 is shaded with a dot pattern.

Figure 10:
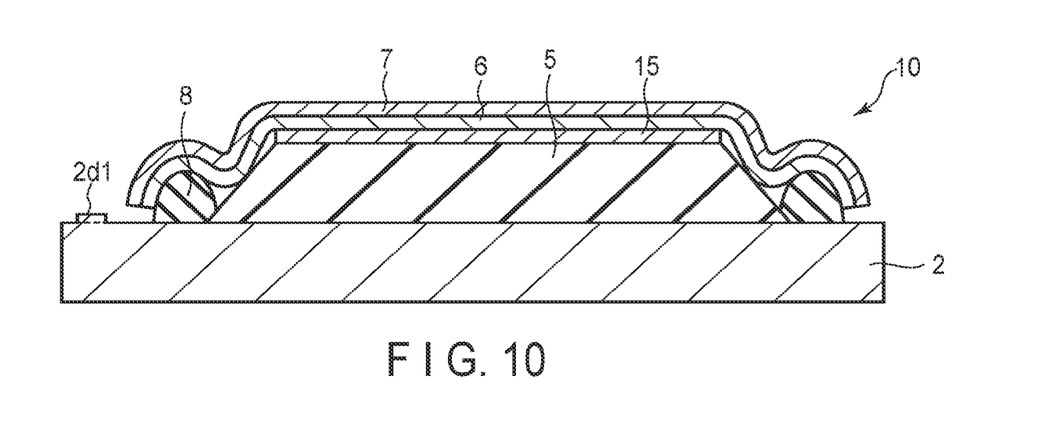
FIG. 10 is a sectional view showing part of an X-ray detection module of an X-ray detector according to modification 2 of the above embodiment.

As shown in FIG. 10, the X-ray detector 1 in modification 2 may further include a light-reflecting layer 15. The light-reflecting layer 15 is provided between the scintillator layer 5 and the moisture absorbing layer 6. The light-reflecting layer 15 is located at least in the detection area DA. The light-reflecting layer 15 is provided to improve resolution and sensitivity by increasing the utilization efficiency of light (fluorescence). That is, the light-reflecting layer 15 reflects the light generated in the scintillator layer 5 which is directed to the side opposite to the side where the photoelectric conversion section 2b is provided, to direct the reflected light toward the photoelectric conversion section 2b.

Part of the light incident from the scintillator layer 5 transmits the light-reflecting layer 15 and enters the moisture absorbing layer 6, and is reflected by the moisture absorbing layer 6 and transmitted through the moisture absorbing layer 6. Even if the X-ray detector 1 includes the light-reflecting layer 15, the photoelectric conversion substrate 2 can detect a change in the light transmittance of the moisture absorbing layer 6. Even in modification 2, the X-ray detector 1 capable of detecting the amount of moisture permeating into the X-ray detector can be obtained.

For example, the light-reflecting layer 15 can be formed by coating the scintillator layer 5 with a coating material that is a mixture of light-scattering particles such as titanium oxide (TiO2), resin and solvent, followed by drying the coating material.

Note that the structure or the manufacturing method of the light-reflecting layer 15 is not limited to the above examples but various modifications can be made. For example, the light-reflecting layer 15 may be formed by forming a layer made of metal with high light reflectivity, such as silver alloy and aluminum, on the scintillator layer 5. Alternatively, the light-reflecting layer 15 may be formed by providing the scintillator layer 5 with a sheet whose surface contains a metal layer with high light reflectivity, such as silver alloy and aluminum, and a resin sheet containing light-scattering particles.

If a paste-like coating material is applied onto the scintillator layer 5 and then dried, it shrinks as it dries. Thus, tensile stress may be applied to the scintillator layer 5 and the scintillator layer 5 may be detached from the photoelectric conversion substrate 2. It is thus preferable to provide the sheet-like light-reflecting layer 15 on the scintillator layer 5. In this case, the light-reflecting layer 15 can be bonded onto the scintillator layer 5 using, for example, double-sided tape, but it is preferable to place the light-reflecting layer 15 on the scintillator layer 5. If the sheet-like light-reflecting layer 15 is placed on the scintillator layer 5, it is possible to easily suppress the peeling of the scintillator layer 5 from the photoelectric conversion substrate 2, which is caused by the expansion or contraction of the light-reflecting layer 15.

The light transmittance of the moisture absorbing layer 6 may be changed by changing the amount of moisture in the moisture absorbing layer 6. The moisture absorbing layer 6 is not limited to a change from white to transparency, but various modifications can be made.

The techniques described in the above embodiment and modifications are not limited to the above X-ray detector 1, but can be applied to other X-ray detectors and various radiation detectors. The radiation detectors have only to include a radiation detection panel to detect radiation, instead of the X-ray detection panel PNL.

What is claimed is:

1. A radiation detector comprising:
   a photoelectric conversion substrate having a detection area and a non-detection area outside the detection area;
   a scintillator layer provided on the photoelectric conversion substrate and located at least in the detection area;
   a frame-shaped sealant located in the non-detection area, surrounding the scintillator layer, and bonded to the photoelectric conversion substrate;
   a cover provided above the scintillator layer, located in the detection area and the non-detection area, and bonded to the sealant to cover the scintillator layer with the photoelectric conversion substrate and the sealant; and
   a moisture absorbing layer which is provided between the scintillator layer and the cover and located at least in the detection area and whose a light transmittance changes as an amount of moisture inside changes,
   wherein
   the moisture absorbing layer covers the entire scintillator layer in planar view.

2. The radiation detector of claim 1, wherein
   the moisture absorbing layer contains aluminosilicate.

3. The radiation detector of claim 2, wherein
   the aluminosilicate is zeolite.

4. The radiation detector of claim 1, wherein
   the moisture absorbing layer contains aluminum oxide.

5. The radiation detector of claim 1, wherein
   the moisture absorbing layer contains silica gel.

6. The radiation detector of claim 1, wherein
   the moisture absorbing layer is bonded to the cover, and
   the moisture absorbing layer has stiffness that is lower than that of the cover.

7. The radiation detector of claim 6, wherein
   the moisture absorbing layer has elastic modulus that is lower than that of the cover.

8. The radiation detector of claim 6, wherein
   the sealant is formed of a material containing a thermoplastic resin.

9. The radiation detector of claim 1, wherein
the moisture absorbing layer is white and changes from white to transparency as the amount of moisture inside increases.

10. The radiation detector of claim 1, wherein
the cover is bonded directly to the sealant.

11. The radiation detector of claim 1, wherein
the moisture absorbing layer is bonded to the cover, extends above the sealant with the cover, and is bonded directly to the sealant.

12. The radiation detector of claim 1, further comprising:
a light-reflecting layer between the scintillator layer and the moisture absorbing layer.

* * * * *